United States Patent
Cortes et al.

(10) Patent No.: US 8,301,498 B1
(45) Date of Patent: Oct. 30, 2012

(54) VIDEO CONTENT ANALYSIS FOR AUTOMATIC DEMOGRAPHICS RECOGNITION OF USERS AND VIDEOS

(75) Inventors: Corinna Cortes, New York, NY (US); Sanjiv Kumar, Brooklyn, NY (US); Ameesh Makadia, New York, NY (US); Gideon Mann, New York, NY (US); Jay Yagnik, Mountain View, CA (US); Ming Zhao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/488,126

(22) Filed: Jun. 4, 2012

Related U.S. Application Data

(63) Continuation of application No. 12/392,987, filed on Feb. 25, 2009, now abandoned.

(60) Provisional application No. 61/147,736, filed on Jan. 27, 2009.

(51) Int. Cl.
  *G06Q 30/00* (2012.01)
  *G06N 5/02* (2006.01)
(52) U.S. Cl. ............ 705/14.49; 700/52; 700/73; 725/35
(58) Field of Classification Search ................. 705/14.49
See application file for complete search history.

(56) References Cited

U.S. PATENT DOCUMENTS

| | | | |
|---|---|---|---|
| 2007/0053513 A1* | 3/2007 | Hoffberg | 380/201 |
| 2009/0132355 A1* | 5/2009 | Begeja et al. | 705/14 |
| 2009/0154806 A1* | 6/2009 | Chang et al. | 382/173 |
| 2011/0307332 A1* | 12/2011 | Kim et al. | 705/14.49 |

* cited by examiner

*Primary Examiner* — Elizabeth Rosen
*Assistant Examiner* — Joan Goodbody
(74) *Attorney, Agent, or Firm* — Fenwick & West LLP

(57) ABSTRACT

A video demographics analysis system selects a training set of videos to use to correlate viewer demographics and video content data. The video demographics analysis system extracts demographic data from viewer profiles related to videos in the training set and creates a set of demographic distributions, and also extracts video data from videos in the training set. The video demographics analysis system correlates the viewer demographics with the video data of videos viewed by that viewer. Using the prediction model produced by the machine learning process, a new video about which there is no a priori knowledge can be associated with a predicted demographic distribution specifying probabilities of the video appealing to different types of people within a given demographic category, such as people of different ages within an age demographic category.

20 Claims, 3 Drawing Sheets

VIDEO CONTENT ANALYSIS FOR AUTOMATIC DEMOGRAPHICS RECOGNITION OF USERS AND VIDEOS

CROSS REFERENCE TO RELATED APPLICATIONS

The application is a continuation of application Ser. No. 12/392,987, filed Feb. 25, 2009, which claims the benefit of Provisional Application No. 61/147,736, filed on Jan. 27, 2009, both of which are hereby incorporated herein by reference.

BACKGROUND

1. Field of Art

The present invention generally relates to the field of digital video, and more specifically, to methods of correlating demographic data with characteristics of video content.

2. Background of the Invention

Video hosting sites, such as YouTube or Google Video, currently have millions of users and tens of millions of videos. Users may sometimes have difficulty in determining which videos would be of interest to them, and may be daunted by the sheer volume of videos available for viewing. Thus, the ability to suggest which videos would be of interest to a given user is highly valuable.

However, conventional systems typically merely rely on external metadata associated with the video, such as keywords or textual video descriptions, to predict demographics that would be interested in the video. For example, conventional systems might recommend videos having keywords matching those specified in a viewer profile as being of interest to that viewer. However, if the video is new and has not yet been viewed and rated, and if the associated title is "spam" that misrepresents the true content of the video, then the conventional approach produces spurious predictions. Thus, one shortcoming of conventional approaches is that they rely on external metadata that may be false when assessing the pertinence of a given video to a particular viewer, rather than examining the actual video content itself.

SUMMARY

A video demographics analysis system creates demographic prediction models that predict the demographic characteristics of viewers of a video, based on quantitative video content data extracted from the videos.

In one aspect, the system selects a training set of videos to use to correlate viewer demographic attributes—such as age and gender—and video content data. The video demographics analysis system determines which viewers have viewed videos in the training set, and extracts demographic data from the viewer profiles of these viewers. The demographic data can include any information describing demographic attributes of the viewers, including but not limited to age, gender, occupation, household income, location, interests, and the like. From the extracted demographic data, the system creates a set of demographic distributions for each video in the training set. The video demographics analysis system also extracts video data from videos in the training set, the video data comprising quantitative information on visual and/or audio features of the videos. Then, a machine learning process is applied to correlate the viewer demographics for the training set videos with the video data of the training set videos, thereby creating a prediction model for the training set videos.

In another aspect, the system uses a prediction model produced by the machine learning process to predict, for a video about which there is little or no prior information about the demographics of viewers, a demographic distribution specifying probabilities of the video appealing to viewers in various different demographic categories, such as viewers of different ages, genders, and so forth. The ability to obtain predicted demographic distributions for a video has a number of useful applications, such as determining a group to which to recommend a new video, estimating the demographics of a viewer lacking a reliable user profile, and recommending videos to a viewer based on the viewer's demographic attributes.

In one embodiment, a computer-implemented method of generating a prediction model for videos receives a plurality of videos from a video repository, each video having an associated list of viewers. For each video, the method creates a demographic distribution for a specified demographic based at least in part on user profile data associated with viewers of the video, and generates feature vectors based on the content of the video. The method further generates a prediction model that correlates the feature vectors for the videos and the demographic distributions, and stores the generated prediction model.

In one embodiment, a computer-implemented method for determining demographics of a video stores a prediction model that correlates viewer demographic attributes with feature vectors extracted from videos viewed by viewers, wherein the viewer demographic attributes include age and gender. The method further generates from content of the video a set of feature vectors, and uses the trained prediction model to determine likely demographic attributes of video viewers given that feature vector.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
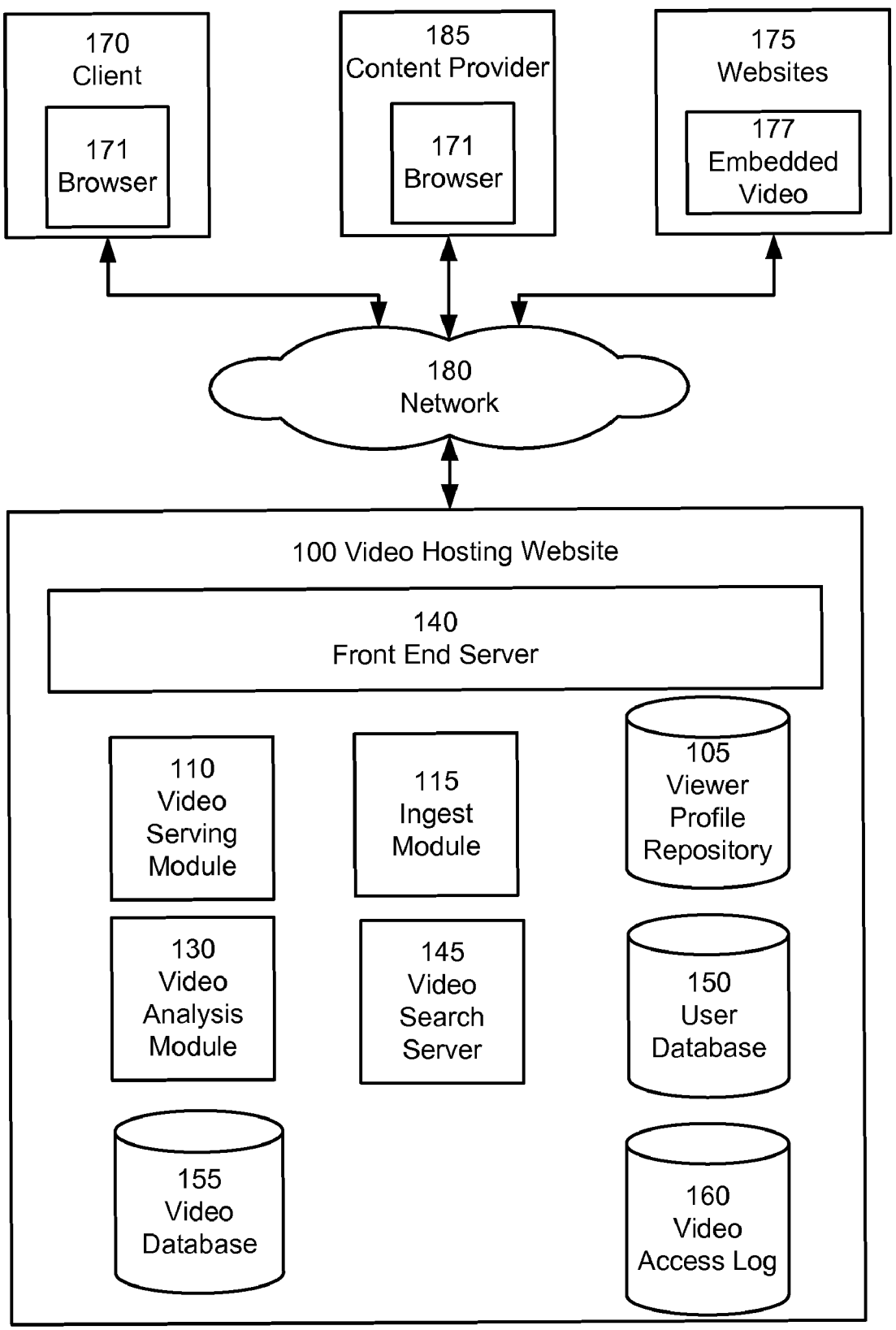
FIG. 1 illustrates the architecture of a video demographics analysis system, according to one embodiment.

FIG. 1 illustrates the architecture of a system for performing video demographics analysis of viewer profile information and digital video content and correlating demographic and video feature data, according to one embodiment.

As shown in FIG. 1, a video hosting website 100 comprises a front end server 140, a video serving module 110, an ingest module 115, a video analysis server 130, a video search server 145, a video access log 160, a user database 150, and a video database 155. Many conventional features, such as firewalls, load balances, application servers, failure servers, site management tools and so forth are not shown so as not to obscure the features of the system.

Most generally, the video hosting website 100 represents any system that allows users (equivalently "viewers") to access video content via searching and/or browsing interfaces. The sources of videos can be from user uploads of videos, searches or crawls of other websites or databases of videos, or the like, or any combination thereof. For example, in one embodiment a video hosting site 100 can be configured to allow for user uploads of content; in another embodiment a video hosting website 100 can be configured to only obtain videos from other sources by crawling such sources or searching such sources in real time. A suitable website 100 for implementation of the system is the YOUTUBE™ website, found at www.youtube.com; other video hosting sites are known as well, and can be adapted to operate according to the teaching disclosed herein. It will be understood that the term "web site" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

Each of the various servers and modules is implemented as a server program executing on server-class computer comprising a CPU, memory, network interface, peripheral interfaces, and other well known components. The computers themselves preferably run an open-source operating system such as LINUX, have generally high performance CPUs, 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

A client 170 executes a browser 171 and can connect to the front end server 140 via a network 180, which is typically the internet, but can also be any network, including but not limited to any combination of a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the video hosting website 100 at any time. The client 170 may include a variety of different computing devices. Examples of client devices 170 are personal computers, digital assistants, personal digital assistants, cellular phones, mobile phones, smart phones or laptop computers. As will be obvious to one of ordinary skill in the art, the present invention is not limited to the devices listed above.

The browser 171 can include a video player (e.g., Flash™ from Adobe Systems, Inc.), or any other player adapted for the video file formats used in the video hosting website 100. Alternatively, videos can be accessed by a standalone program separate from the browser 171. A user can access a video from the video hosting website 100 by browsing a catalog of videos, conducting searches on keywords, reviewing play lists from other users or the system administrator (e.g., collections of videos forming channels), or viewing videos associated with particular user groups (e.g., communities).

Users of clients 170 can also search for videos based on keywords, tags or other metadata. These requests are received as queries by the front end server 140 and provided to the video search server 145, which is responsible for searching the video database 155 for videos that satisfy the user queries. The video search server 145 supports searching on any fielded data for a video, including its title, description, tags, author, category and so forth.

Users of the clients 170 and browser 171 can upload content to the video hosting website 100 via network 180. The uploaded content can include, for example, video, audio or a combination of video and audio. The uploaded content is processed by an ingest module 115, which processes the video for storage in the video database 155. This processing can include format conversion (transcoding), compression, metadata tagging, and other data processing. An uploaded content file is associated with the uploading user, and so the user's account record is updated in the user database 150 as needed. For purposes of convenience and the description of one embodiment, the uploaded content will be referred to as "videos," "video files," or "video items," but no limitation on the types of content that can be uploaded is intended by this terminology. Thus, the operations described herein for identifying related items can be applied to any type of content, not only videos; other suitable type of content items include audio files (e.g. music, podcasts, audio books, and the like), documents, multimedia presentations, and so forth. In addition, related items need not be of the same type. Thus, given a video, the related items may include one or more audio files, documents, and so forth in addition to other videos.

The video database 155 is used to store the ingested videos. The video database 155 stores video content and associated metadata provided by their respective content owners. Each uploaded video is assigned a video identifier (id) when it is processed by the ingest module 115. The video files have metadata associated with each file such as a video ID, artist, video title, label, genre, time length, and optionally geo-restrictions that can be used for data collection or content blocking on a geographic basis. The video files are can be encoded as H.263, H.264, WMV, VC-1 or the like; audio can be encoded as MP3, AAC, or the like. The files can be stored in any suitable container format, such as Flash, AVI, MP4, MPEG-2, RealMedia, DivX and the like.

The video hosting website 100 further comprises viewer profile repository 105. The viewer profile repository 105 comprises a plurality of profiles of users/viewers of digital videos, such as the users of video hosting systems such as YouTube™ and Google Video™ A viewer profile stores demographic information on various attributes of an associated viewer, such as the viewer's gender, age, location, income, occupation, level of education, stated preferences, and the like. The information may be provided by viewers themselves, when they create a profile, and can be further supplemented with information extracted automatically from other sources. For example, one profile entry could specify that the viewer was a 24-year-old male, with a college education, living in Salt Lake City, and with specified interests in archaeology and tennis. The exact demographic categories stored in the viewer profile can vary in different embodiments, depending on how the profiles are defined by the system administrator.

The video hosting website 100 further comprises a video access log 160, which stores information describing each access to any video by any viewer. Thus, each video effectively has an associated list of viewers. Each individual viewer is assigned an ID, for example, based on his or her IP address to differentiate the individual viewers. In one embodiment, this viewer ID is an anonymized viewer ID that is assigned to each individual viewer to keep viewer identities private, such as an opaque identifier such as a unique random number or a hash value. The system then can access each viewer's demographic information without obtaining his or her identity. In an alternative embodiment, the actual identity of the viewers may be known or determinable. In any case, for each viewer, the video access log 160 tracks the viewer's interactions with videos. In one embodiment, each entry in the video access log 160 identifies a video being accessed, a time of access, an IP address of the viewer, a viewer ID if available, cookies, the viewer's search query that led to the current access, and data identifying the type of interaction with the video. Interaction types can include any viewer interactions in the viewer interface of the website, such as playing, pausing, rewinding and forwarding a video. The various viewer interaction types are considered viewer events that are associated with a given video. For example, one entry might store that a viewer at a given IP address started viewing a particular video at time 0:00:00 and stopped viewing at time 0:34:00.

The video hosting website 100 further comprises a video analysis server 130, which correlates demographic information about videos with the content of the videos themselves. This involves generating demographic distributions from demographic data, analyzing video content, and generating a prediction model relating the demographic distributions and the video content. The video analysis module 130 also can predict a demographic distribution for a video and serve demographic queries (e.g., provide information about demographic information across videos).

Figure 2:
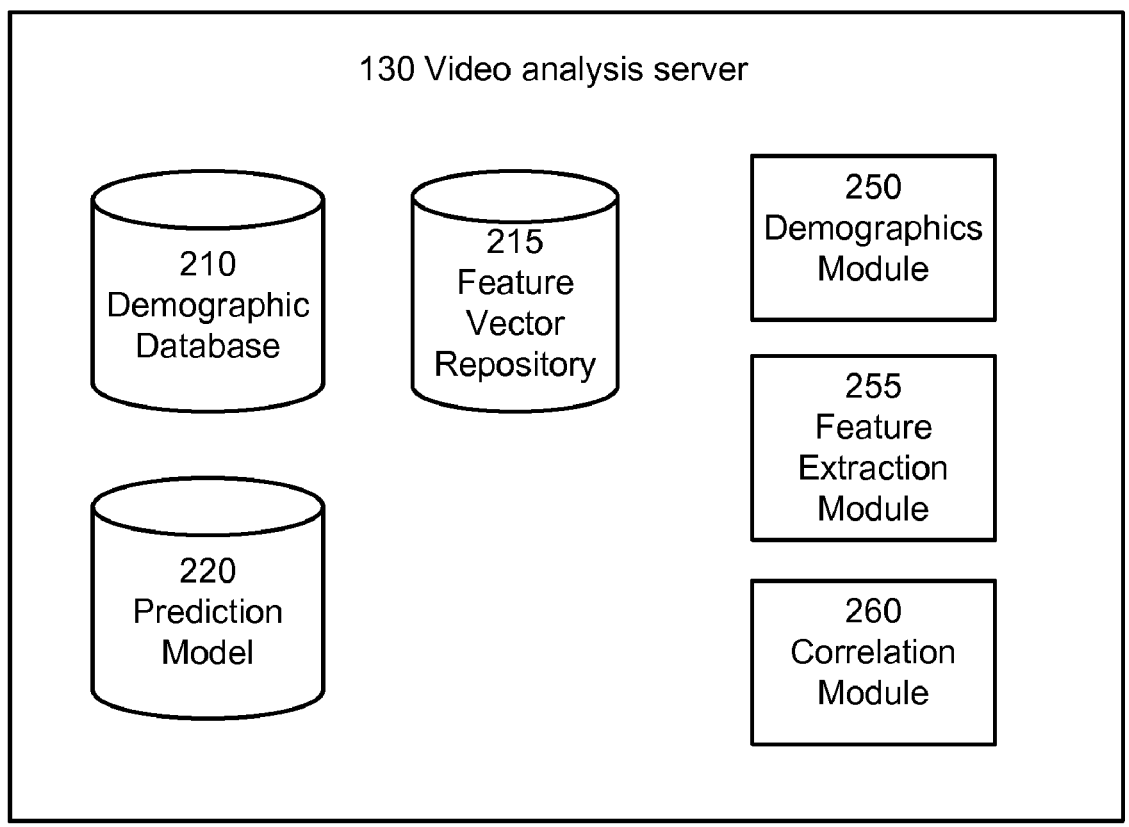
FIG. 2 illustrates the components of a video analysis server, according to one embodiment.

Referring now to FIG. 2, there are shown the modules in one embodiment of the video analysis module 130. The analysis module 130 comprises a demographics database 210 and a feature vector repository 215, a demographics module 250, a video content analysis module 255, and a correlation module 260, and additionally comprises a prediction model 220.

The demographics database 210 stores data regarding distributions of demographic data with respect to videos. For example, certain videos can have an associated demographic distribution for various demographic attributes of interest, such as age and gender. In some embodiments, distributions are created for combined attributes, such gender-age, e.g. for a given video, that 4% of viewers are females aged 13 to 17. For instance, a given video may have an age-gender distribution such as the following:

|  | 13-17 | 18-21 | 22-25 | 26-30 | ... |
| --- | --- | --- | --- | --- | --- |
| Male | 5.6 | 12.3 | 13.8 | 8.5 | ... |
| Female | 4.0 | 8.6 | 10.2 | 9.6 | ... |

This distribution states that 5.6% of its viewers are male of ages 13 to 17, 4% are females of ages 13 to 17, 12.3% are males of ages 18 to 21, and the like. The values in the example distribution represent percentages of the viewers having the corresponding demographic characteristics, but they could also be normalized with respect to the general population, e.g. a value of 1.3 for males aged 13-17 indicating that 30% more of the viewings were by males aged 13-17 than their respective share of the population.

Generally, any demographic attribute stored in a viewer profile may have corresponding distributions. A given demographic attribute may be represented at various different levels of granularity, such as 1-year, 3-year, or 5-year bins for ages, for example. Similarly, a given video can have a gender distribution in which 54% of its viewers are female, 38% of its viewers are male, and 8% are unknown, where the unknown values represent viewers lacking profiles or viewers with profiles lacking a value for the gender attribute. As an alternative to storing "unknown" values in the distributions, profiles lacking a value for an attribute of interest could be excluded during training.

In one embodiment, the distributions are represented as vectors, e.g. an array of integers <0, 6, 11, ... > where each component represents a previously assigned age-bin, representing that 0% of viewers are from ages 13 to 17, 6% are 18 to 21, and 11% are 22 to 25. Other storage implementations would be equally possible to one of skill in the art.

The demographics module 250 takes as input the data in the viewer profile repository 105 and creates the data on distributions stored in the demographic database 210. The feature extraction module 255 takes as input the video data in the video repository 110 and the video access log data 160 and extracts feature vectors representing characteristics of the videos, such as visual and/or audio characteristics, and stores them in the feature vector repository 215. The correlation module 260 performs operations such as regression analysis on the data in the demographic database 210 and the feature vector repository 215, generating a prediction model 220 that can be, for example, used to predict particular viewer demographics to which a video represented by given feature vectors would be of interest. The operations of the modules 250-260 are described in more detail below with respect to FIG. 3.

Note that although the various data 210-220 and the modules 250-260 are depicted as all being located on a single server 130, they could be partitioned across multiple machines, databases or other storage units, and the like. The data 210-220 could be stored in a variety of manners as known to one of skill in the art. For example, they could be implemented as tables of a relational database management system, as individual binary or text files, etc.

Process of Demographic Correlation

Figure 3:
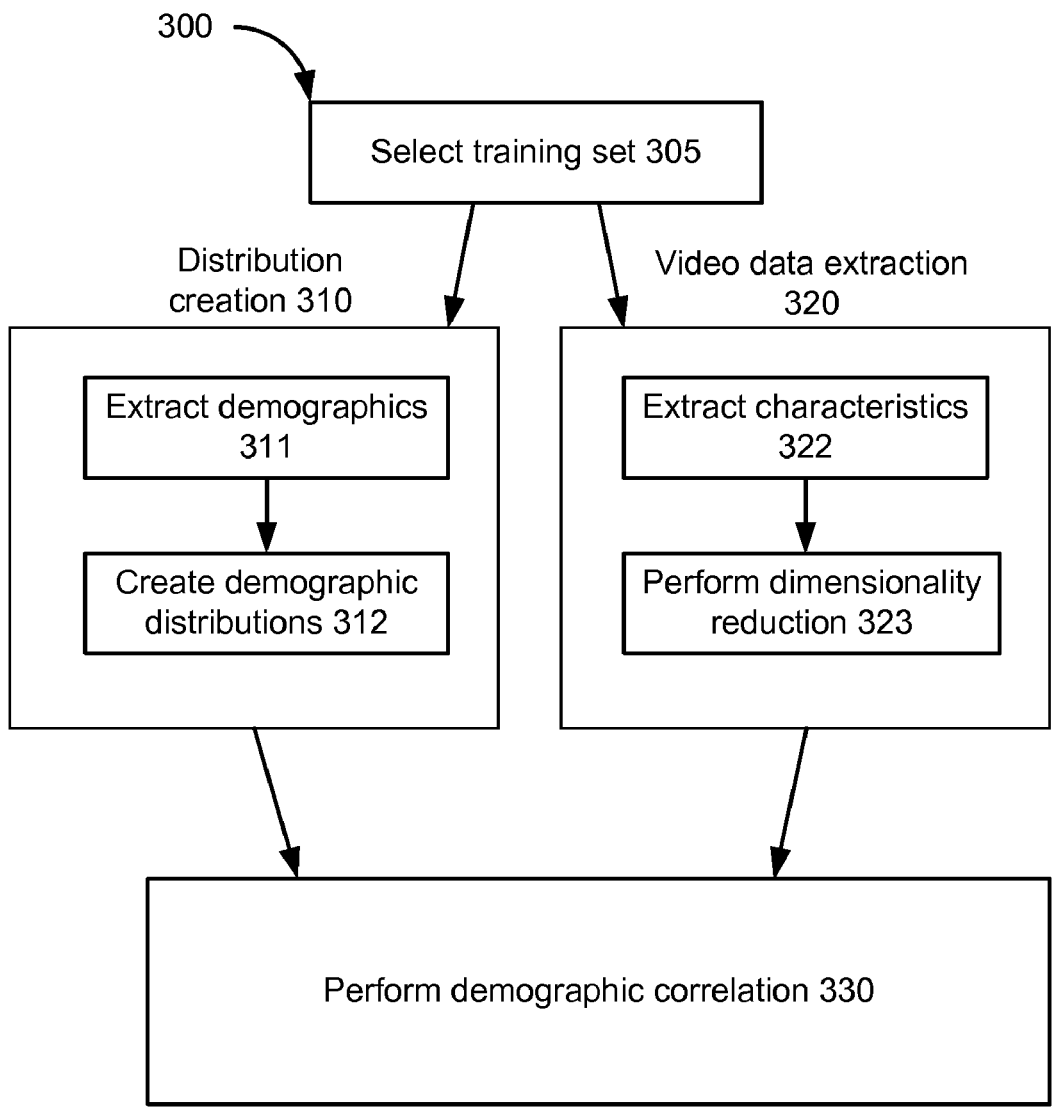
FIG. 3 is a flowchart illustrating a high-level view of a process of performing the correlation, according to one embodiment.

FIG. 3 is a flowchart illustrating a high-level view of a process for performing the correlation of the correlation module 260, according to one embodiment. First, a training set of videos is selected 305 from the video database 155. In some embodiments, the training set is a subset of the videos of the video database 155, given that analyzing only a representative training set of videos is more computationally efficient than analyzing the entire set, though in other embodiments it is also possible to analyze all videos. The training set can be selected based on various filtering criteria. These filtering criteria include a number of views, number of viewers, number of unique views, date of views, date of upload and so forth. The filtering criteria can be used in any combination. For example, the training set can be established as the N videos (e.g., N=1000) which have been viewed at least K times (e.g., K=1,000,000) in the previous M (e.g., M=15) days, and which are at least T seconds (e.g., 30 seconds) in length. Here, K, M, N, and T are design decisions selected by the system administrator. The most recently viewed videos, or the videos viewed over a certain time period, can be determined by examining the start and stop dates and times of the video access log 160, for example. A video can be deemed to be "viewed" if it is watched for a minimum length of time, or a minimum percentage of its total time.

With the training set of videos identified, the process of correlating video data (e.g. feature vectors representing the images of the video) with demographic data performs two independent operations, which may be performed in parallel: creation of demographic database 310 and extraction of video data 320. Based on the results of these operations, correlation of the demographic and video data can be performed. These processes are repeated for each video in the training set.

During distribution creation 310, the demographics are first extracted 311 from the viewer profiles associated with a given video. This entails identifying the viewers specified in the video access log 160 as having watched the given video within the relevant time period or number of viewings, retrieving their associated viewer profiles in the viewer profile repository 105, and retrieving the demographic attributes of interest from the identified viewer profiles. Those viewer profiles lacking the demographics attributes of interest may be excluded from demographic creation, or they may be considered as "unspecified" entries with respect to those attributes, for example. For example, if age and gender are the attributes of interest, then all viewer profiles having these attributes are examined, and those viewer profiles for which the attributes are not specified are not examined. Attributes may also be filtered to discard those that appear to be inaccurate. For example, age attributes below or above a certain threshold age, e.g. under the age of 3 or over the age of 110, could be discarded on the assumption that it is unlikely that a person of that age would genuinely be a viewer.

Demographic distributions are then created 312 based on the extracted attributes. As previously noted, data representing continuous values such as age or income can be segregated into bins. The range for each bin for a given attribute can be varied as desired for the degree of granularity of interest. The distribution data may be stored in different types of data structures, such as an array, with the value of an array element being derivable from the array index. Values representing discrete unrelated values, such as location or level of education, can be stored in an arbitrary order, with one value per element. Each attribute bin stores a count for the number of values in the bin from the viewer profiles. Once all the relevant attributes have been factored into their corresponding distributions, the result is a set of distributions, one per video, for every relevant attribute and/or combinations thereof. As mentioned above, these distributions include age distribution, gender distribution, income distribution, education distribution, location distribution, and the like. Any of these can be combined into multi-attribute distributions, e.g., age-gender, or age-income, or gender-location.

Independently of the distribution creation 310, the video content analysis module 255 extracts 320 video data from each video in the training set of videos, representing the data as a set of "feature vectors." A feature vector quantitatively describes a visual (or auditory) aspect of the video. Different embodiments analyze either or both of these categories of aspects.

In general, feature vectors are associated with frames of the video. In one embodiment, the feature vectors are associated not merely with a certain frame, but with particular visual objects within that frame. In such an embodiment, when extracting data relating to visual aspects, the video content analysis module 255 performs 321 object segmentation on a video, resulting in a set of visually distinct objects for the video. Object segmentation preferably identifies objects that would be considered foreground objects, rather than background objects. For example, for a video about life in the Antarctic, the objects picked out as part of the segmentation process could include regions corresponding to penguins, polar bears, boats, and the like, though the objects need not actually be identified as such by name.

Different object segmentation algorithms may be employed in different embodiments, such as adaptive background subtraction, spatial and temporal segmentation with clustering algorithms, and other algorithms known to those of skill in the art. In one embodiment, a mean shift algorithm is used, which employs clustering within a single image frame of a video. In segmentation based on the mean shift algorithm, an image is converted into tokens, e.g. by converting each pixel of the image into a corresponding value, such as color value, gradient value, texture measurement value, etc. Then windows are positioned uniformly around the data, and for each window the centroid—the mean location of the data values in the window—is computed, and each window re-centered around that point. This is repeated until the windows converge, i.e. a local center is found. The data traversed by windows that converged to the same point are then clustered together, producing a set of separate image regions. In the case of a video, the same or similar image regions typically exist across video frames, e.g. a region representing the same face at the same location across a number of frames, or at slightly offset locations. In this case, one of the set of similar regions can be chosen as representative and the rest discarded, or the data associated with the images may be averaged.

The result of application of a segmentation algorithm to a video is a set of distinct objects, each occupying one of the regions found by the segmentation algorithm. Since different segmentation algorithms—or differently parameterized versions of the same algorithm—tend to produce non-identical results, in one embodiment multiple segmentation algorithms are used, and objects that are sufficiently common across all the segmentation algorithm results sets are retained as representing valid objects. An object segmented by one algorithm could be considered the same as that of segmented by another algorithm if it occupies substantially the same region of the image content object as the other segmented object, e.g. having N % of its pixels in common, where N can be, for example, 90% or more; a higher value of N results in a greater assurance that the same object was identified by the different algorithms. The object could be considered sufficiently common if it is the same as objects in the result sets of all the other segmentation algorithms, or a majority or a set number or percentage thereof.

Characteristics are extracted 322 from content of the video. In one embodiment, the characteristics are represented as feature vectors, lists of data pertaining to various attributes, such as color (e.g. RGB, HSV, and LAB color spaces), texture (as represented by Gabor and Haar wavelets), edge direction, motion, optical flow, luminosity, transform data, and the like. In different embodiments, a given frame (or object of a frame) may be represented by one feature vector, or by a number of feature vectors corresponding to different portions of the frame/object, e.g. to points at which there is a sharp change between color values, or different attributes. In any case, the extracted feature vectors are then stored within the feature vector repository 215 in association with the video to which they correspond.

Some embodiments create feature vectors for audio features, instead of or in addition to video features. For example, audio samples can be taken periodically over a chosen interval. As a more specific example, the mel-frequency cepstrum coefficients (MFCCs) can be computed at 10 millisecond intervals over a duration of 30 seconds, starting after a suitable delay from the beginning of the video, e.g. 5 seconds. The resulting MFCCs may then be averaged or aggregated across the 30 second sampling period, and are stored in the feature vector repository 215. Feature vectors can also be derived based on beat, pitch, or discrete wavelet outputs, or from speech recognition output or music/speaker identification systems.

Some embodiments create feature vectors based on metadata associated with the video. Such metadata can include, for example, video title, video description, date of video uploading, the user who uploaded, text of a video comment, a number of comments, a rating or the number of ratings, a number of views by users, user co-views of the video, user keywords or tags for the video, and the like.

The feature vector data when extracted are frequently not in an ideal state, containing a large number of feature vectors, some of which are irrelevant, adding no additional information. The potentially large number and low quality of the feature vectors increases the computational cost and reduces the accuracy of later techniques that analyze the feature vectors. In order to reduce the size and improve the quality of the feature vector data, the video content analysis module 255 therefore performs 323 dimensionality reduction. Different embodiments may employ different algorithms for this purpose, including principal component analysis (PCA), linear discriminant analysis (LDA), multi-dimensional scaling (MDS), Isomap, locally linear embedding (LLE), and other similar algorithms known to those of skill in the art. The result of application of a dimensionality reduction algorithm to a first set of feature vectors is a second, smaller set of vectors representative of the first set, which can replace their prior, non-reduced versions in the feature vector repository 215.

With the demographic database 210 and feature vector repository 215 populated with data as a result of steps 310 and 320, respectively, the correlation module 260 correlates 330 (i.e., forms some association between) the demographics and the video content as represented by the feature vectors, creating as output a prediction model 220 that represents all videos in the training set. The correlation is performed based on machine learning techniques, such as supervised algorithms such as support vector machines (SVM), boosting, nearest neighbor, or decision tree, semi-supervised algorithms such as transductive learning, or unsupervised learning, such as clustering. In one embodiment, SVM kernel logistic regression techniques are employed.

Regardless of the particular algorithm employed, the output is a predicted distribution for the demographic categories in question, and is stored as a prediction model 220. In the case of a demographic category such as age that can be represented with a continuous distribution function, the distribution can be stored as a set of discrete values, e.g. a probability for each year in an age distribution, thus creating a discrete approximation of a continuous distribution. Alternately, coefficients of an equation generating a function representing the distribution can be stored. For demographic categories inherently having discrete values, such as gender or location, a set of probabilities may be provided, one per value, for example. Thus, given a set of feature vectors representing a video, the prediction model 220 will have a set of corresponding predicted distributions for various demographic attributes.

For example, one prediction model storing data for the age demographic attribute could be as in the below table, where each of the three rows represents a set of feature vectors and their corresponding age distribution for ages 13-17, 18-21, etc. It is appreciated that such a table is merely for purposes of example, and that a typical implementation would have much additional data for more sets of feature vectors, a greater number and granularity of ages, more demographic attributes or combinations thereof, and the like.

| Feature vectors | 13-17 | 18-21 | 22-25 | 26-30 | ... |
|---|---|---|---|---|---|
| F1, F2, F3 | 10% | 18% | 32% | 19% | ... |
| F4, F5 | 15% | 22% | 38% | 16% | ... |
| F6, F7 | 30% | 20% | 10% | 5% | ... |

Applications of the Prediction Model

The video hosting website 100 provides a number of different usage scenarios. One usage scenario is prediction of demographic attribute values for a video, such as newly submitted video. In this scenario, a video that has not been previously classified for its demographic attributes is received. This can be a video that has been previously uploaded to the video hosting website 100, or a video that is currently in the process of being uploaded. This video's visual and/or audio feature vectors are extracted by the feature extraction module 255. Then, the extracted feature vectors are matched against those of the prediction model 220, and a set of feature vectors are identified that provide the closest match, each feature vector having a match strength. In one embodiment, the match strength is determined by use of a measure matrix. In one embodiment, the prediction model uses a predefined similarity measure, e.g. Gaussian kernel between pairs of feature vectors. In one embodiment, only one closest feature vector is identified—i.e. the set contains only one feature vector—and the corresponding demographic distributions for the demographic attributes in question are retrieved from the prediction model 220. In another embodiment, the set may contain multiple feature vectors, in which case the demographic distributions may be linearly combined, with the respective match strengths providing the combination weightings. In another embodiment, the set of feature vectors as a whole is used to look up corresponding demographic distributions in the prediction model 220. For example, if the age and gender demographic categories are of interest, then for a given video, predicted distributions could be produced that comprise probabilities that viewers of the video would be in the various possible ages and of the male and female genders. The ability to obtain predicted demographic distributions with respect to a given video has various useful applications.

A second usage scenario, related to the first scenario, is to identify top demographic values of an attribute of interest for which a new video would be likely be relevant. For example, when a video is analyzed the probabilities that a viewer would be of the various ages within the age demographic category could be computed as in the first scenario, the probabilities sorted, and a determination made that the video appeals most strongly to people of the age range(s) with the top probability, e.g. 13-15 year olds.

A third usage scenario is to determine likely demographic values associated with a viewer who either lacks a viewer profile, or whose viewer profile is untrustworthy (e.g., indicates an improbable attribute, such as being above age 110). In this application, the viewer's previously-watched videos are identified by examining the video access log 160 for the videos retrieved by the same IP address as the viewer. From this list of videos one or more videos are selected, and their feature vectors retrieved from the feature vector repository 215 (if present) or their feature vectors are extracted by the video content analysis module 255. The resulting feature vectors are then input into the prediction model 220 to obtain the predicted demographics for each video. To estimate the viewer's demographic, the demographic strengths for each video watched by that viewer can be combined, such as by averaging the demographics for each video, by averaging that includes weighting the demographics for the videos according to how frequently the respective videos were watched by that viewer, and the like. As a result, combined probabilities can be computed for each demographic category, and a top value or values chosen in each, e.g. 21 as the age value, and male as the gender value, representing that the viewer is believed to most probably be a 21 year old male.

Another usage scenario is to predict, for a given set of demographic attribute values, what videos would be of interest to viewers with such demographics. This is useful, for example, to create a list of recommended videos for such a viewer. This scenario involves further processing of the demographic probability data to identify the top-scoring videos for a given demographic value, and the processed data can then be used as one factor for identifying what videos may be of interest to a given viewer. For example, when a new video is submitted, the video demographics analysis server 130 computes a set of demographic values having the highest match probabilities for the video for categories of interest. For instance, for a video containing content related to social security benefits, the highest value for the gender category might be female with match strength 0.7, the highest attribute values for the age category might be 60, 62, 63, 55, and 65, with respective match strengths 0.8, 0.7, 0.75, 0.85, and 0.8, and the highest attribute values for the gender-age combination category might be female/60 and female/62, with respective match probabilities 0.95 and 0.9. These computed demographic probabilities can be stored for each video, e.g. as part of the video database 155, and a list of the videos with the top scores for each demographic category attribute stored. For example, the top-scoring videos for people of age 41 might be a video trailer for the film "Pride & Prejudice" and a video on landscaping, and the top-scoring videos for males with college degrees might be a video about mortgage foreclosures and an instructional video on golf.

These lists of top videos for different demographics can then be applied to identify recommendations for related videos. For example, if a viewer is viewing a video about the Antarctic with submitter-supplied description "Look at the cute penguins," the video demographics analysis server 130 can refer to his profile, determine that he is a male college graduate, and potentially recommend the videos on mortgage foreclosures and golf instruction, based upon the videos associated with these demographics via the prediction model. These recommendations can be made in addition to those recommended based on other data, such as the keyword "penguins," keywords specified in the viewer's profile as being of interest to that viewer, and the like. The demographics-derived recommendations can be displayed unconditionally, in addition to the other recommendations, or conditionally, based on comparisons of computed relevance values, for example. Similarly, the various recommendations may be ordered according to computed relevance values, with each recommendation source—e.g. derived from demographics, or from keyword matches—possibly having its own particular formula for computing a relevance value.

Still another usage scenario is serving demographic queries, i.e. providing demographic information across videos. For example, a user (either a human or a program) could submit a query requesting the average age of the viewers across all the videos in the video database 155, or some subset of these videos, the answer factoring in estimated ages of users who otherwise lack profiles. As another example, a user could submit a query requesting the top 10 videos for women aged 55 or older.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of generating a prediction model for videos, comprising:
    accessing a plurality of videos stored in a video repository, each video associated with a plurality of viewers who have viewed the video;
    for each video, creating a demographic distribution for at least one demographic attribute based at least in part on viewer demographic data associated with the plurality of viewers who have viewed the video;
    for each video, generating feature vectors based at least in part on video content of frames of the video;
    generating by a computer system a prediction model that correlates the feature vectors for the plurality of videos and the demographic distributions for the plurality of videos; and
    storing the prediction model.

2. The computer-implemented method of claim 1, wherein the demographic attribute is one of age and gender.

3. The computer-implemented method of claim 1, wherein the demographic attribute is one of occupation, household income, and location.

4. The computer-implemented method of claim 1, wherein the prediction model is generated using support vector machines.

5. The computer-implemented method of claim 1, further comprising altering the generated feature vectors using a dimensionality reduction algorithm.

6. The computer-implemented method of claim 1, wherein the generated feature vectors further include features vectors generated based on audio content of the video.

7. The computer-implemented method of claim 1, wherein the generated feature vectors include feature vectors that are generated at least in part on metadata associated with the video.

8. The computer-implemented method of claim 1, further comprising:
    performing object segmentation on a frame of the video, thereby identifying a visual object of the frame;
    wherein generating feature vectors based at least in part on the content of the video comprises generating feature vectors for the identified visual object.

9. A computer-implemented method for determining demographics of a video, comprising:
    accessing a prediction model that correlates viewer demographic attributes with feature vectors extracted from a plurality of videos viewed by a plurality of viewers, wherein the viewer demographic attributes include age and gender;
    receiving a video;
    generating, from video content of frames of the video, a set of feature vectors; and
    identifying, by a computer system, demographic attribute values by applying the prediction model to the generated set of feature vectors.

10. The computer-implemented method of claim 9, wherein identifying demographic attribute values comprises:
    identifying a set of feature vectors of the prediction model that is most similar to the generated set of feature vectors; and
    identifying, in the prediction model, demographic attribute values most strongly correlated with the identified feature vectors.

11. A computer-implemented method for identifying demographics associated with a viewer, comprising:
    accessing a prediction model that correlates viewer demographic attributes with feature vectors generated from a plurality of videos viewed by a plurality of viewers;
    identifying a set of videos viewed by a given viewer;
    generating, from video content of frames of the set of videos, a set of feature vectors;
    applying the feature vectors to the prediction model to identify viewer demographic attribute values most strongly correlated with the feature vectors of the prediction model; and
    identifying, by a computer system, viewer demographic attribute values most strongly correlated with the given viewer based at least in part on the identified viewer demographic attribute values.

12. A computer-implemented method for identifying videos associated with given demographic attribute values, comprising:
    accessing a prediction model that correlates viewer demographic attributes with feature vectors generated from a plurality of videos viewed by a plurality of viewers;
    receiving a plurality of videos;
    for each video of the plurality of received videos:
        generating, from video content of frames of the video, a set of feature vectors;
        applying the feature vectors generated from the video to the prediction model to identify viewer demographic attribute values most strongly correlated with the feature vectors of the prediction model;
        storing the identified viewer demographic attribute values in association with the video;
    selecting, by a computer system, videos having highest values for the given demographic attribute values; and
    displaying identifiers of the selected videos.

13. A non-transitory computer readable storage medium storing a computer program executable by a processor for generating a prediction model for videos, the actions of the computer program comprising:
    accessing a plurality of videos stored in a video repository, each video associated with a plurality of viewers who have viewed the video;
    for each video, creating a demographic distribution for at least one demographic attribute based at least in part on viewer demographic data associated with the plurality of viewers who have viewed the video;
    for each video, generating feature vectors based at least in part on video content of frames of the video;

generating by a computer system a prediction model that correlates the feature vectors for the plurality of videos and the demographic distributions for the plurality of videos; and storing the prediction model.

14. The non-transitory computer readable storage medium of claim 13, wherein the generated feature vectors include features vectors generated based on audio content of the video.

15. The non-transitory computer readable storage medium of claim 13, wherein the prediction model is generated using support vector machines.

16. A computer system for generating a prediction model for videos, comprising:
- a computer processor;
- a video repository storing a plurality of videos, each video associated with a plurality of viewers who have viewed the video;
- a non-transitory computer-readable storage medium storing executable instructions that when executed by the computer processor perform actions comprising:
  - accessing a plurality of videos stored in the video repository;
  - for each video, creating a demographic distribution for at least one demographic attribute based at least in part on viewer demographic data associated with the plurality of viewers who have viewed the video;
  - for each video, generating feature vectors based at least in part on video content of frames of the video;
  - generating a prediction model that correlates the feature vectors for the plurality of videos and the demographic distributions for the plurality of videos; and
  - storing the prediction model.

17. The computer system of claim 16, wherein the demographic attribute is one of age and gender.

18. The computer system of claim 16, wherein the prediction model is generated using support vector machines.

19. The computer system of claim 16, wherein the generated feature vectors include features vectors generated based on audio content of the video.

20. The computer system of claim 16, wherein the generated feature vectors include feature vectors that are generated at least in part on metadata associated with the video.

* * * * *